United States Patent [19]
Fisher et al.

[11] Patent Number: 5,329,977
[45] Date of Patent: Jul. 19, 1994

[54] PELLET VENEER LATHE

[76] Inventors: Gerald M. Fisher, 1491 Greenwood Ave., Palo Alto, Calif. 94301; Robert S. Smith, 1263 Emory St., San Jose, Calif. 95126

[21] Appl. No.: 65,998

[22] Filed: May 21, 1993

Related U.S. Application Data

[63] Continuation-in-part of Ser. No. 895,605, Jun. 8, 1992, Pat. No. 5,215,135.

[51] Int. Cl.⁵ .............................................. B27L 5/02
[52] U.S. Cl. ................................ 144/213; 144/209 R; 144/365
[58] Field of Search .................. 144/209 R, 211, 212, 144/213, 365

[56] References Cited

U.S. PATENT DOCUMENTS

| | | | |
|---|---|---|---|
| 3,078,887 | 2/1963 | Heth | 144/213 A |
| 3,372,721 | 3/1968 | James et al. | 144/213 A |
| 3,600,990 | 8/1971 | Renoux | 144/213 A |
| 4,073,326 | 2/1978 | Pank et al. | 144/213 |
| 4,559,987 | 12/1985 | Fondronnier et al. | 144/213 |
| 4,781,229 | 11/1988 | Wilson | 144/213 |
| 5,215,135 | 6/1993 | Coakley et al. | 144/213 |

Primary Examiner—W. Donald Bray
Attorney, Agent, or Firm—Gerald M. Fisher

[57] ABSTRACT

Methods and apparatus for using a veneer type lathe of compact design for the pellitizing of a log portion directly from the log without intermediate steps. A log saddle with slide guides for the axles of the incisor rolls enables a significant reduction in the complexity of a peripheral drive veneer lathe and permits the use of a single press to clamp, incise and separate the pellets from the log.

12 Claims, 7 Drawing Sheets

PELLET VENEER LATHE

RELATED INVENTION

This is a continuation-in-part of the copending patent application, Ser. No. 07/895,605, filed Jun. 8, 1992, now U.S. Pat. No. 5,215,135, entitled "Pellitizer Method and Apparatus", inventors Robert Coakley and Gerald M. Fisher, which prior patent is incorporated herein by reference.

FIELD OF THE INVENTION

This invention relates to methods and apparatus for making fuel pellets directly from a log.

BACKGROUND OF THE INVENTION

The related patent incorporated herein by reference discloses a new concept for making fuel pellets directly from a log by incising the cross section of a desired pellet into the periphery of a log and by cutting/peeling the log in a veneer lathe type apparatus wherein the veneer depth is less than the depth of the incisions in the periphery of the log.

Veneer lathe devices, especially those used for plywood manufacture, are generally large and very expensive precision devices. There is a need for a lathe device which is customized for the manufacture of pellets and which is smaller and very much less expensive.

Accordingly, it is an object of this invention to provide methods and apparatus to provide a compact, low cost, veneer lathe type device which manufactures pellet fuel directly from logs at a high rate at low operating cost.

It is a further object to provide a pellitizer which can be transported and operated in the forest to reduce the production costs and the transportation costs of pellets produced thereby.

BRIEF DESCRIPTION OF THE DRAWINGS

FIG. 2a is a isometric illustration of an apparatus for combining a press with the rolls and veneer knife according to this invention.

FIG. 2b is a schematic of the end view of the saddle housing of FIG. 2a.

FIG. 2c is a schematic isometric, of the lower roll mount assembly of FIG. 2a.

DETAILED DESCRIPTION OF THIS INVENTION

Figure 1:
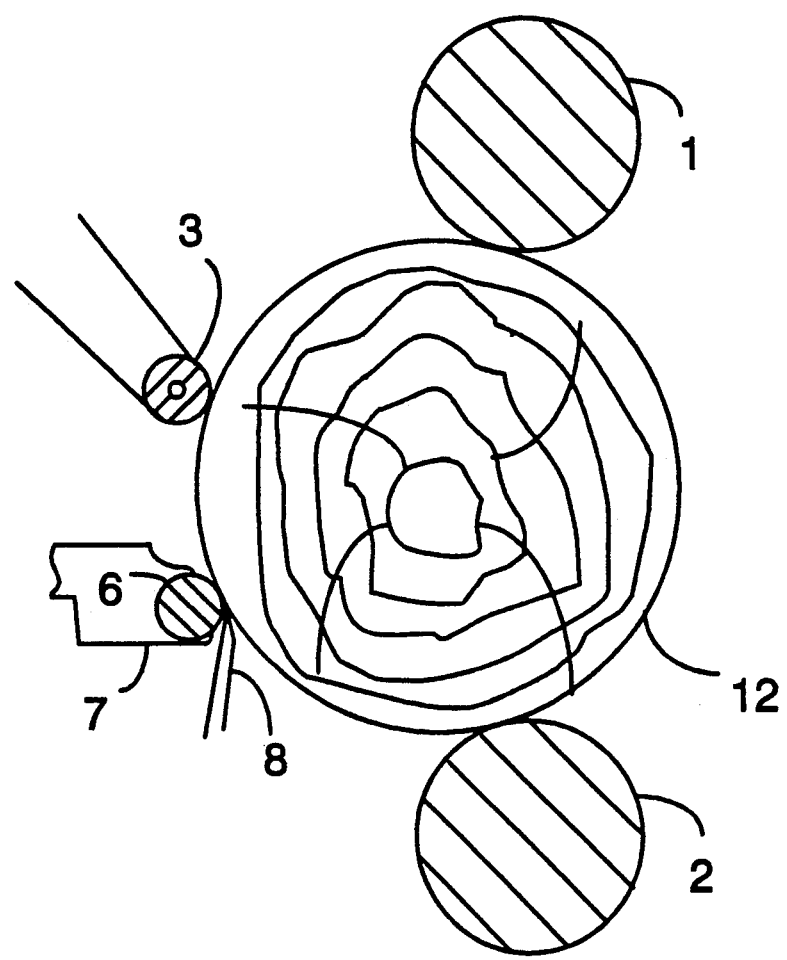
FIG. 1 is a functional diagram of a peripheral drive and incisor roll arrangement of the lathe type pellitizer of this invention.

With reference to FIG. 1, the log 12 to be pellitized is grasped and compressed between three rolls 1,2,and 3. Roll 6 is a nose bar which is very close to knife 8 and placed as a backup anvil to the knife 8. One or two of the rolls can be peripheral incisor drives and one or two of the rolls can be idler incisor rolls. The rolls which are incisor drive rolls or incisor idler rolls are grooved as depicted in the issued patent incorporated herein by reference to accomplish incision during compression and rotation of the log 12.

Figure 5:
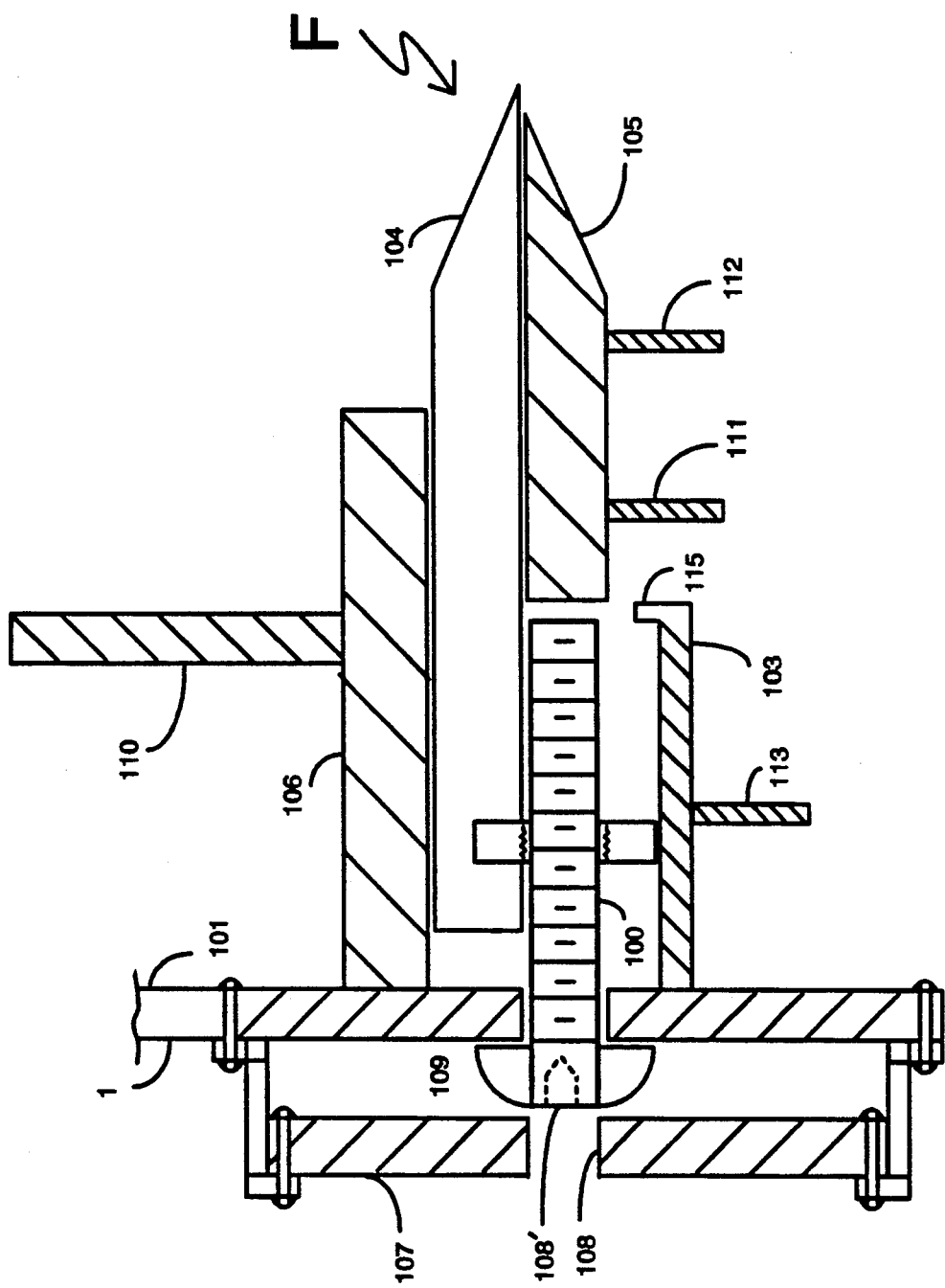
FIG. 5 is a drawing of a preferred veneer knife assembly of this invention.

With reference to FIG. 2(a), a compact, low cost pellitizer of our invention is disclosed. The apparatus consists of an press 10 having a head portion 10-15, side tension members 10-9, 10-9' and foot cross members 10-8. Immediately below the press head is a saddle shaped housing 30 for the veneer knife assembly 8 (FIG. 5). The roll slide guides 30-6 and 30-7 are channels in the end plates 30-10 and 30-11. Although not shown in FIG. 2(a), mounted to the foot cross member 10-8 via bars 60-13 is a lower roll mount assembly 60, FIG. 2(c). The roll mount assembly 60 supports the driver/incisor roll 60-1. The idler incisor roll 60-2 is mounted on a second roll mount assembly 60' which connects to the opposite side of the foot cross member 10-8 via bars 60-13.

As shown in FIG. 2(a), the piston 10-5 of the hydraulic cylinder 10-6 is able to provide compressive force to the saddle 30 at the sleeve 30-1. The saddle 30 is able to be forced downwardly by the piston to provide the pressure necessary to incise any log or portion thereof which is placed inside the saddle and which is clamped between rolls 60-1, 60-2 and the nose bar rolls 30-3. The drive motor 60-3 provides peripheral drive to the log by direct engagement of the teeth of the drive/incisor roll 60-1 with the log. The pillow block 60-4 supports the axle of roll 60-1 for rotation on the opposite side of the drive roll from the motor. The roll mount frame 60-5 is slideably mounted via eye slides 60-6 and 60-7 to the adjustable press cross support member 10-5 by the support bars 60-13 which pass through the eye slides 60-6 and 60-7.

Figure 2:
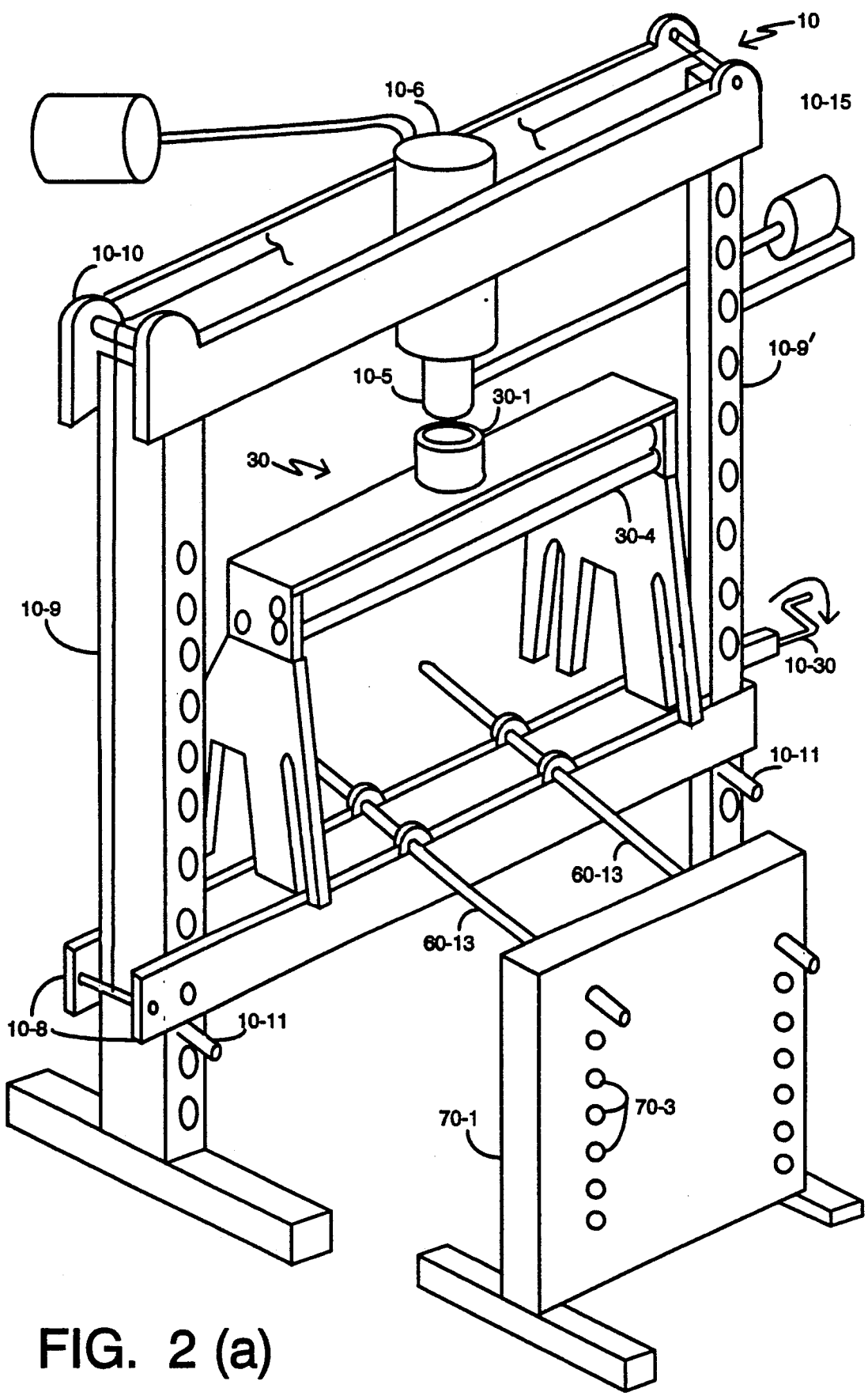
Figure 2:
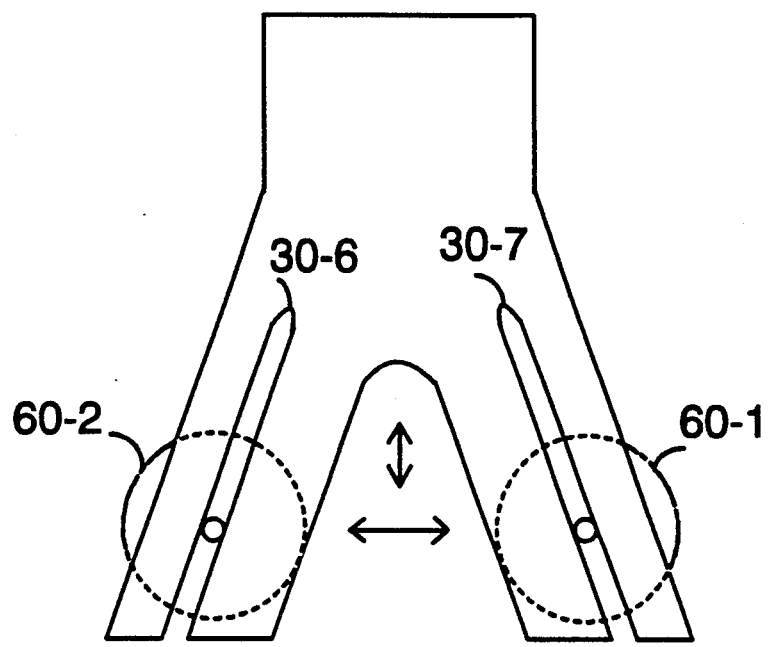
Figure 2:
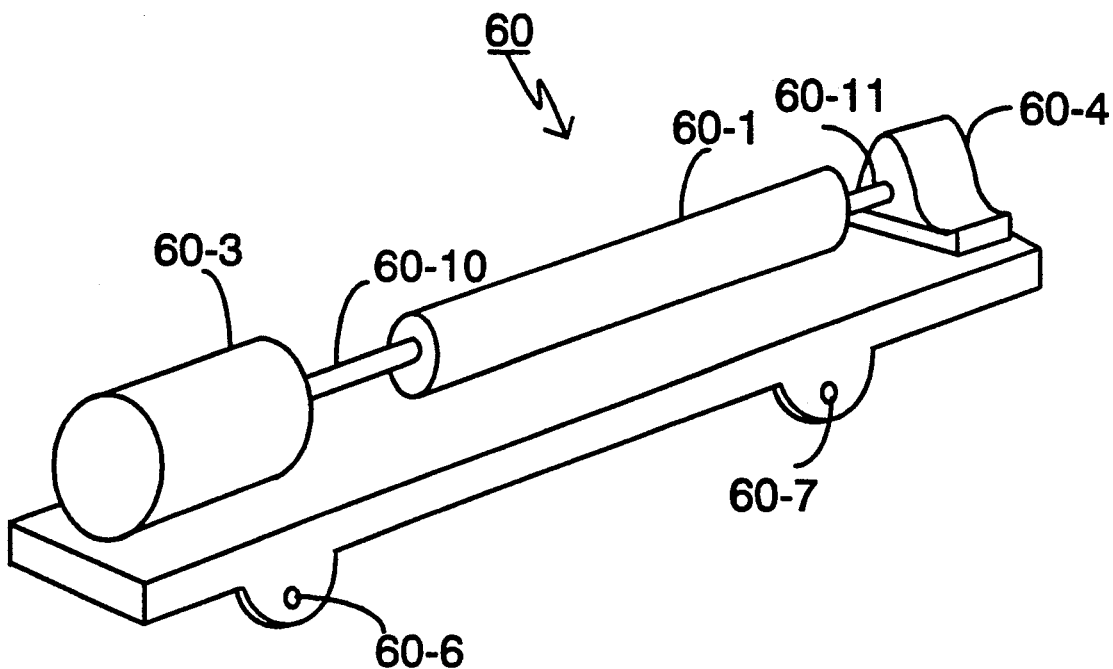
Figure 3:
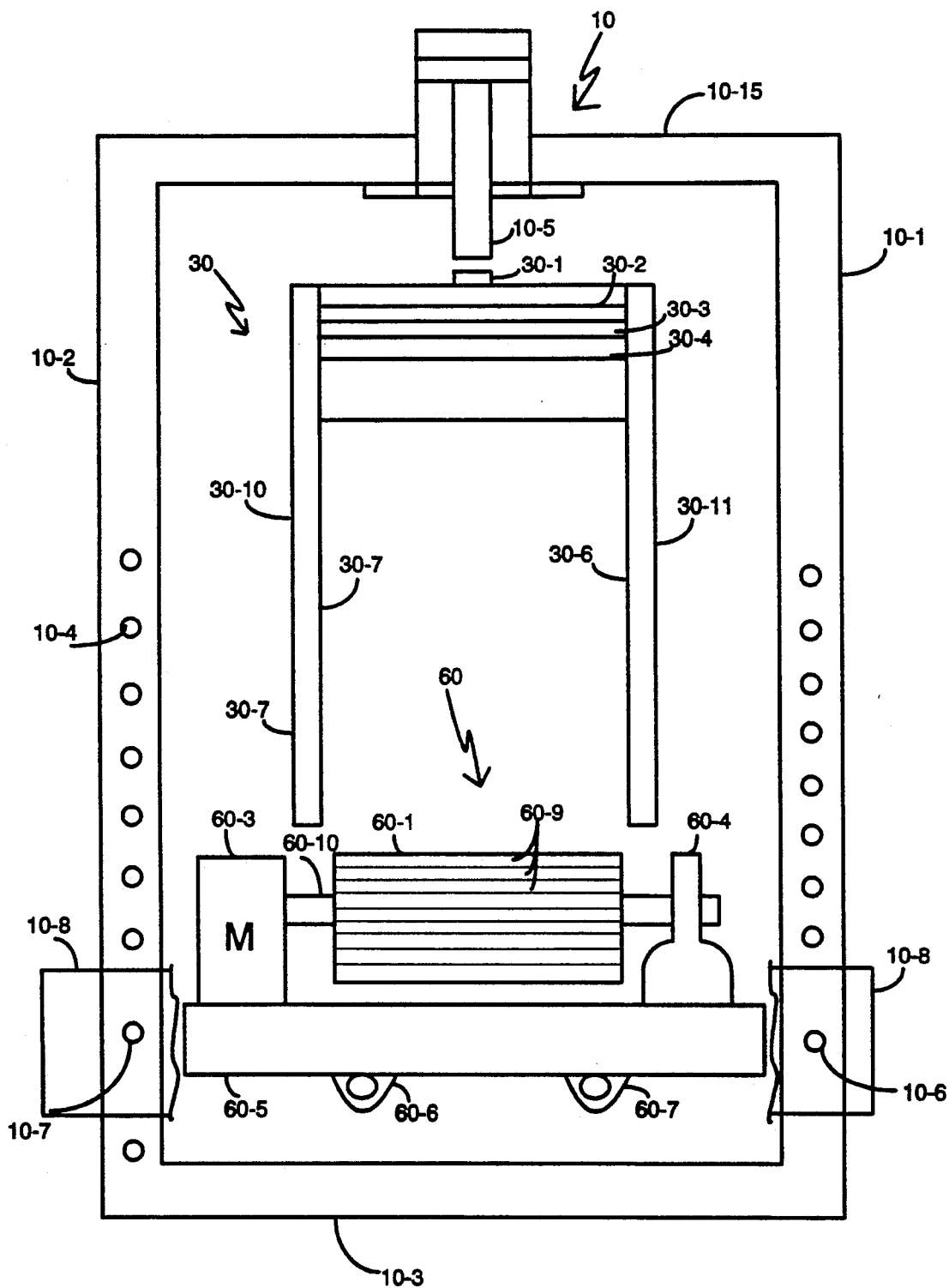
FIG. 3 is a plan view of the apparatus of FIG. 2
Figure 4:
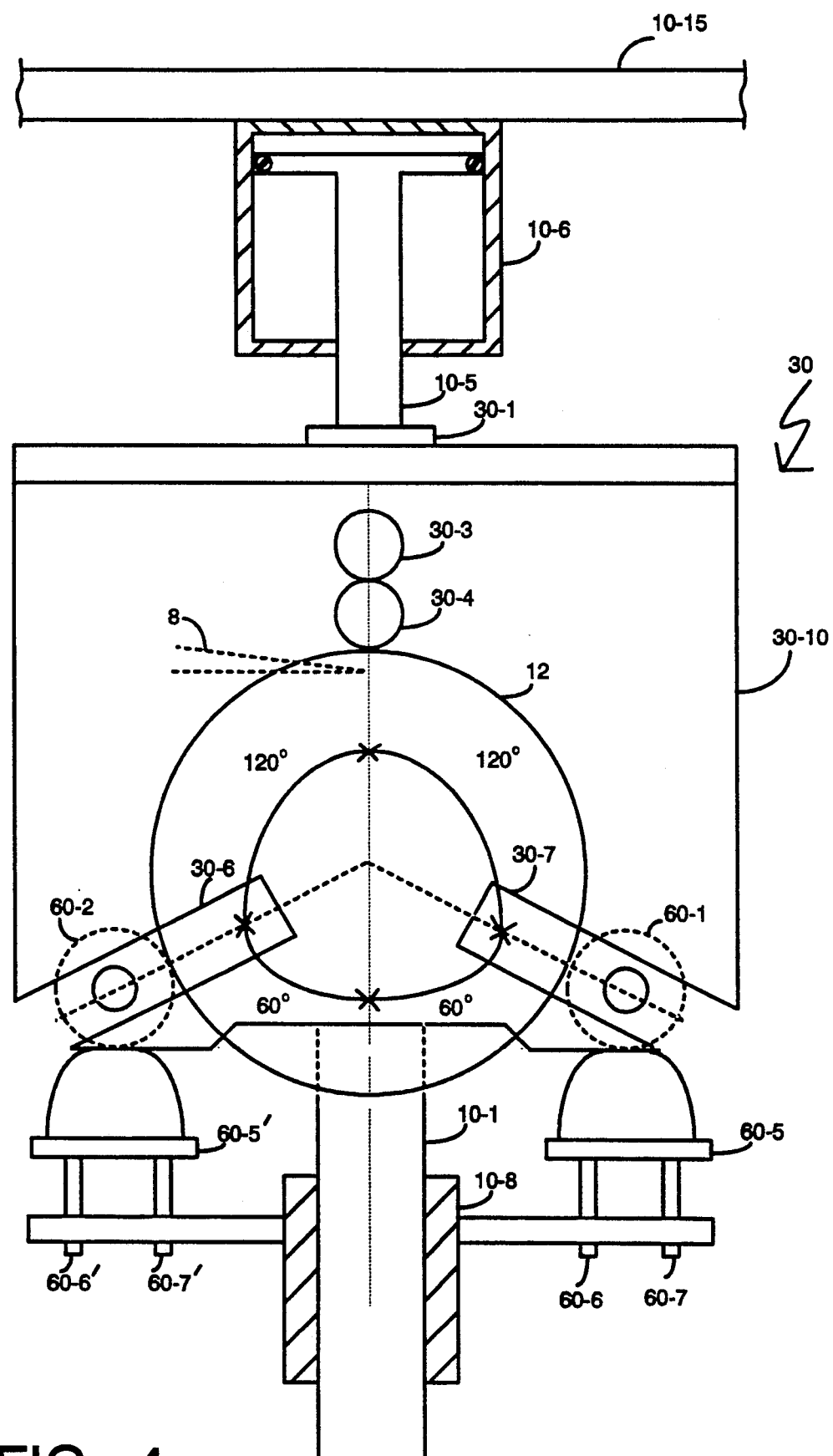
FIG. 4 is a plan view of the saddle assembly disclosing the roll slide guides.

Also, as seen in FIG. 2(a), FIG. 3 and FIG. 4, the axles 60-10 and 60-11 of roll 60-1 are slideable in the end plate guide slide slots 30-6' and 30-7' of the saddle 30. The idler roll 60-2 axle is likewise slideable in the opposite side end plate guide 30-7 of the saddle 30. The nose bar is a roll 30-3 which is also journaled in the end plates of the saddle 30. A backup nose bar roll 30-4 is also provided to provide stiffness across the length of the nose bar roll and knife.

Depending on the diameter of the log to be pellitized, and the diameter of the incisor rolls as well as the length of the stroke of the piston 10-5, the lower roll mount assembly 60 and foot cross member 10-8 need to be adjusted before peeling operations and then pinned into position by pins 10-6 and 10-7 into press side members 10-1 and 10-2 respectively.

The initial vertical position of the cross member 10-8 is determined by withdrawing the piston 10-5 upwardly to the limit, carrying saddle 30 with it thereby providing space for a log to fit between the nose bar rolls 30-3 and the rolls 60-1 and 60-2. If necessary, the foot cross member 10-8 is moved down by cable and pully assembly 10-10 via crank 10-30 to make room for the log to be inserted inside the saddle and the foot cross member is then supported and retained by pins 10-11 to the press tension members 10-9 and 10-9'. The drive motor and compression starts at this time. As the log is being peeled, there may come a time when the stroke of the piston 10-5 is at its maximum but the log is not completely pellitized. Readjustment is then necessary for the position of the piston 10-5 and foot cross member 10-8. The motor and piston are stopped and the piston is withdrawn upwardly to its limit and the foot cross member 10-8 is raised until the piston and saddle again touch the log. At this position the foot cross member is pinned again and the compression and peeling operation is again commenced.

Supplementary optional support members 70-1 and 70-2 are provided with a plurality of available ajustment holes to receive bars 60-13 if necessary to support the weight and compression exerted on the roll mount assembly.

Now, by moving the piston 10-5 downwardly, under large compressive force from the piston or a motor powered screw, the rolls 60-1 and 60-2 incise the log periphery and clamp the log. Next, under the power from motor 60-3 through drive roll 60-1, the log is rotated and forced into the veneer knife 30-2,( if the knife is in the peeling position.) Since the incisions from roll 60-1 are orthogonal to those from roll 60-2, and since the compressive force is adjusted to seat the rolls to the bottom of their teeth in the wood of the log periphery, when the peel occurs, the pellets will be separated immediately so long as the veneer knife depth is less than the depth of the incisions in the log. As the peeling continues, the downward force from the piston is transmitted through the end plates to the axles of the incisors rolls, and causes the rolls to move along the slide guides 30-6 and 30-7 getting closer together as the log diameter is shrinking.

The motor 60-3 is preferably a DC motor because of its torque, ruggedness and reliability. However, any motor type can be used including an internal combustion engine which has the advantage of low cost for a given power requirement.

The details of the knife assembly are shown in FIG. 5. The position of the knife 104 is adjustable by rotating screw 100. Screw 100 is not threaded to the frame 101 but is retained in its position with respect to the frame 101 by virtue of the head 109 of the screw being captured between frame 109 and retaining plate 107. Screw 100 is threaded on a large nut 102 which is unable to turn because of nut slide plate 103. Accordingly, rotary motion of screw 100 is converted to translation of the nut 102 and the knife 104. The nut 102 is fit into a groove in the knife 104 and is able to move the knife in both directions. Backing plates 105 and 106 are placed above and below the knife to provide rigid support and to counteract the torque from the rotating log. A backing plate 107 is also provided to keep the knife forward in cutting position even under the constant force F trying to move the knife away from the log. A hole in plate 108 provides access to the screw for an allen type drive tool to turn screw 100 and adjust the knife position even during operation.

Although the embodiment of FIG. 2 shows the head of the press at the top, it is understood that the press could be arranged in other directions with respect to gravity.

Figure 6:
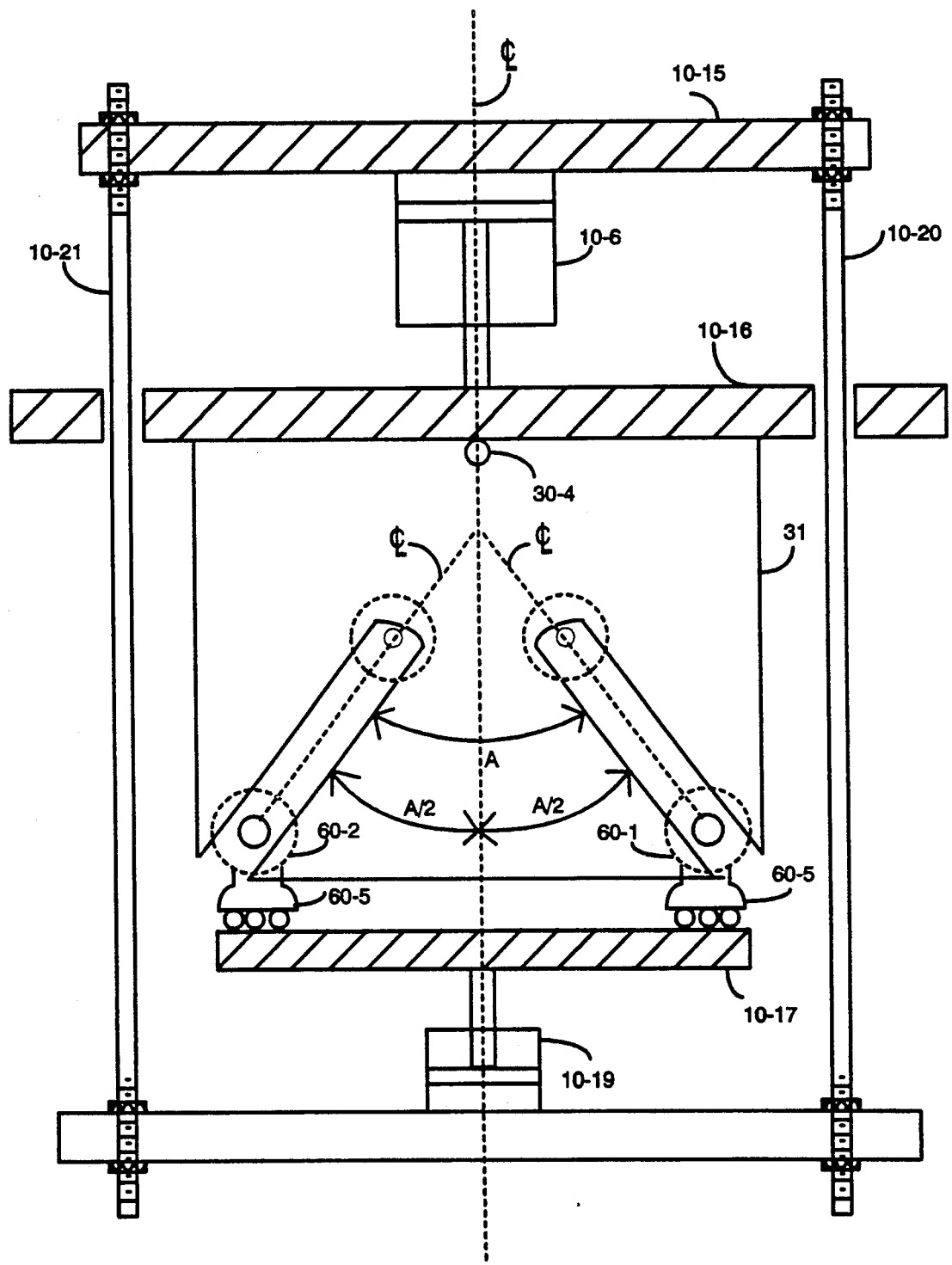
FIG. 6 is a further embodiment of this invention.

With reference to FIG. 6, an alternative press is configured which provides more rugged characteristics than the press of FIG. 2 in that it employes an upper slide 10-16 which slides vetically on four corner frame tension rods 10-20, 10-21, (and 10-22, 10-23 not shown) under the compressive forces from the piston 10-5 mounted between the head frame 10-15 and the slide 10-16. Fixedly mounted to the slide 10-16 is a saddle member 30' with end plates 31 and 32(not shown). Each end plate has a symmetrically arranged slide guide 30-6 and 30-7 which have their center lines on a line which would intersect the nose bar 30-3 close to its point of contact with the log. The preferred angle of each of the slide guides is 60 degrees from the piston force vector.

This angle is preferred for reason explained subsequently but is not critical however and is selected with consideration of the diameter of the incisor rolls and the desired core size of the non-pellitizable portion of the log. The operation will stop when the rolls reach the upper end of the slide guides 30-6 and 30-7, which is designed to keep the rolls from contacting one another while permitting them to get as close together as desired without damaging one another over the life of the machine. Also seen in this embodiment is a lower cylinder and piston 10-19 restrained between the lower head frame and a lower piston heads 10-17. The lower piston head 10-17 is a support mount for the incisor rolls 60-1 and 60-2 via the motor or pillow blocks 60-5 which are mounted to roller bearings 60-10. Piston head 10-17 is shaped to fit inside the saddle 30' as the piston 10-17 is extended outward. The embodiment of FIG. 6 has greater rigidity and can accommodate a higher force cylinder and piston as would be required by a longer length of log being pellitized. Additionally, the second cylinder and piston 10-19 provides a speed and convenience not available with the FIG. 2 embodiment because the peeling/pellitizing operation can continue automatically without requiring stopping for manual adjustments because the upper piston reached it maximum stroke. The lower piston can provide the required rigidity without pinning and can be adjusted in vertical position so that the upper piston would never reach the end of its stroke.

Although the head frame 10-15 of FIG. 6 is shown at the top of the figure, this press could be arranged in any configuration with respect to gravity and in particular could be mounted on its side so that separated dirt and particles and knife lubricants would not fall into regions containing the roller bearings 60-10.

As indicated above, the preferred slide guide configuration is where the angle A between the center lines of the slide guides are arranged to be from 60 to 120 degrees apart and where each center line is from 30 to 60 degrees from the piston force vector passing through the line of contact between the nose bar and the log. The slide guide resolves the vertical force acting on the incisor roll axle to a normal force acting on the incissor roll axle at the point of contact between the roll axle and the slide guide. In this range of the angle A, the normal force at each axle will be on the order of ½ the total vertical force. If the guide center line is made closer than 30 degrees from the piston force vector, the normal force can become much larger which will create stress problems at the bearing surfaces between the roll axle and the slide guide.

The embodiments described herein are not intended to limit the scope of the invention but rather the scope of the invention should be determined by the claims. With this in view,

What is claimed is:

1. A pellitizer of the veneer lathe type comprising,
a press having a frame including a first compression exerting member and compression resisting members and a space between said members for receiving a log portion for compressing and peeling therein;
a log saddle including a veneer knife assembly and a nose bar mounted thereto, said log saddle being in said space between said members, said log saddle including an elongated frame portion having end plates, said end plates having a pair of symmetrical slide glides therein;

a plurality of incisor rolls, each said roll having an axle, each said roll having sharp edges in its surface for incising the periphery of a said log portion, each said axle of each said roll being mounted in a pair of said end plate guide slides, said axles being parallel to one another; and in operation, said first compression exerting member of said press being connectable to said log saddle, for providing force to each said axle of said rolls when a log is in contact position with said nose bar and said rolls, wherein said rolls are automatically forced to become positioned equally spaced about the periphery of a log portion by the action of said symmetrical guide slides responsive to the force provided by said first compression exerting member.

2. The pellitizer of claim 1 wherein said incisor rolls are mounted to said compression resisting members of said press and wherein said compression resisting members are adjustable to accommodate logs having diameters which are larger than the stroke of said first compression exerting member.

3. The pellitizer of claim 2 wherein said slide glides have a center line and wherein said center lines are symmetrically arranged with respect to one another so that an extension of said center lines would intersect the line of said force vector provided by said first compression exerting member at a point.

4. The pellitizer of claim 3 wherein said piston is part of a hydraulic cylinder capable of providing more than 10,000 pounds of force.

5. The pellitizer of claim 3 wherein said compression exerting member is coupled to said saddle and wherein said compression exerting member is able to move said saddle whenever said compression exerting member is moved.

6. The pellitizer of claim 2 wherein said adjustable resistive member is adjusted by a cable and pully system.

7. The pellitizer of claim 2 wherein said adjustable compressive resistive member is adjustable by a second compressive exerting member.

8. The pellitizer of claim 2 wherein said adjustable compressive resistive member is able to be supported rigidly in said adjusted positions by support means connected to said frame.

9. The pellitizer of claim 3 wherein said center lines are arranged to be substantially 120 degrees apart and wherein each said center line is substantially 60 degrees from said force vector provided by said first compression exerting member through said nose bar.

10. A pellitizer lathe comprising:
a plurality of parallel rolls, each said roll having an axle, said plurality of rolls including at least two incissor rolls, each said incissor roll having sharp edges at its surface for incising the periphery of a workpiece placed between said rolls;

press means for pinching said plurality of rolls to clamp a workpiece therebetween, said press means for pinching comprising a press having a frame including a first compression exerting member and compression resistance members and futher including means to couple said compression exerting member to said axles;

a knife means, said knife means including an elogated edge parallel to said axles;

means for rotating a said workpiece at the same time it is being pinched; and means for making a veneer type cut in said workpiece with said knife means.

11. A pellitizer of claim 10 wherein said means to couple said compression exerting member to said axles includes a plurality of slide guides.

12. A pellitizer lathe comprising:
a plurality of parallel rolls, each said roll having an axle, said plurality of rolls including at least two incissor rolls, each said incissor roll having sharp edges at its surface for making an incision in the periphery of a workpiece placed between said rolls;

means for pinching said rolls including axle guide means;

a knife means, said knife means including an elogated edge parallel to said axles;

means for rotating a said workpiece at the same time it is being pinched to incise the workpiece periphery; and means for making a veneer type cut in said workpiece with said knife means to a depth less than the depth of said incision made by said incissor rolls.

* * * * *